United States Patent [19]

Kaufman et al.

[11] Patent Number: 4,906,160

[45] Date of Patent: Mar. 6, 1990

[54] LOADER SUPPORT STAND

[75] Inventors: Charles H. Kaufman, Port Colborne; Daniel G. McCombs, Welland; John R. McMillan, both of Welland, all of Canada

[73] Assignee: Deere & Company, Moline, Ill.

[21] Appl. No.: 234,999

[22] Filed: Aug. 22, 1988

[51] Int. Cl.⁴ .................................. A01D 87/00
[52] U.S. Cl. .................................. 414/686; 172/274
[58] Field of Search ............... 414/686, 685; 172/272, 172/274, 817

[56] References Cited

U.S. PATENT DOCUMENTS

| | | | |
|---|---|---|---|
| 2,830,719 | 4/1958 | Kowalik | 172/274 X |
| 3,043,375 | 7/1962 | Astrom | 172/273 |
| 3,131,823 | 5/1964 | Foster et al. | 214/140 |
| 3,612,311 | 10/1971 | Eidy et al. | 214/140 |
| 3,833,136 | 9/1974 | Spicer et al. | 214/131 A |
| 3,949,889 | 4/1976 | Moe | 214/131 A |
| 4,217,075 | 8/1980 | Frank | 414/686 |
| 4,257,730 | 3/1981 | Kawakita | 414/686 |
| 4,264,264 | 4/1981 | McMillan et al. | 414/686 |
| 4,275,984 | 6/1981 | Lenertz | 414/686 |
| 4,337,015 | 6/1982 | Friesen et al. | 414/686 |
| 4,345,870 | 8/1982 | Anderson et al. | 414/686 |
| 4,347,031 | 8/1982 | Friesen et al. | 414/686 |
| 4,383,793 | 5/1983 | Weir | 414/686 |

FOREIGN PATENT DOCUMENTS

| | | | |
|---|---|---|---|
| 238098 | 1/1965 | Austria | 414/686 |
| 0596187 | 3/1978 | U.S.S.R. | 414/686 |
| 1591755 | 6/1981 | United Kingdom | 172/274 |

Primary Examiner—Robert J. Spar
Assistant Examiner—James T. Eller

[57] ABSTRACT

A parking stand for an agricultural loader particularly well suited for use with tractors having mid-mounted mowers or similar tools carried beneath the tractor. The stand includes a pair of legs for each mast, the legs being adapted to fold between a stored position adjacent the mast and a supporting position extending laterally from the mast.

6 Claims, 4 Drawing Sheets

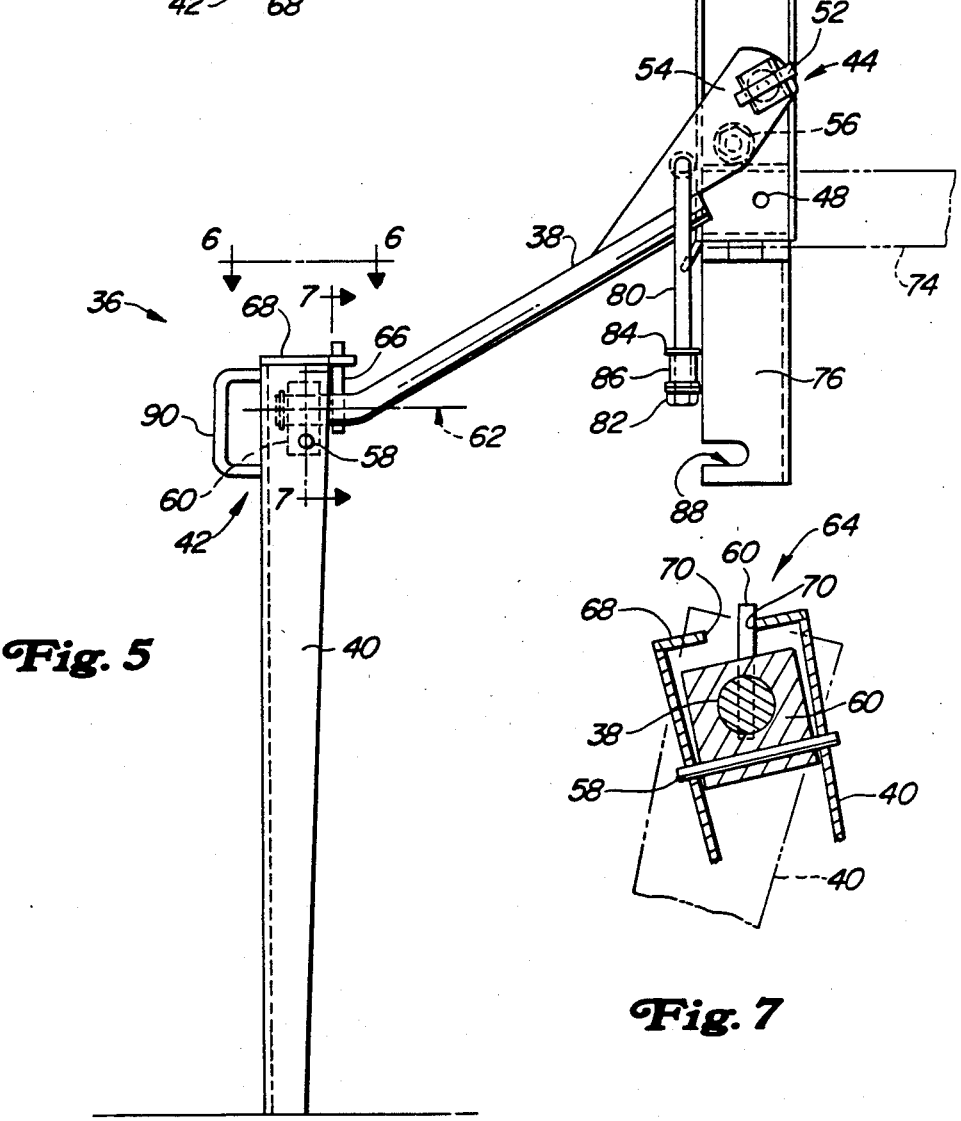

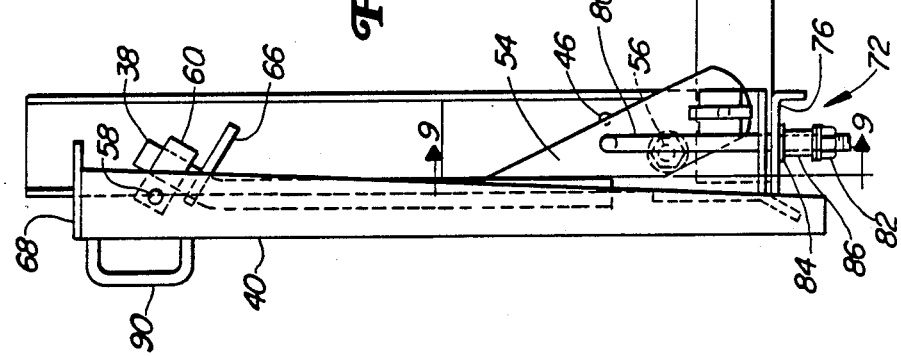
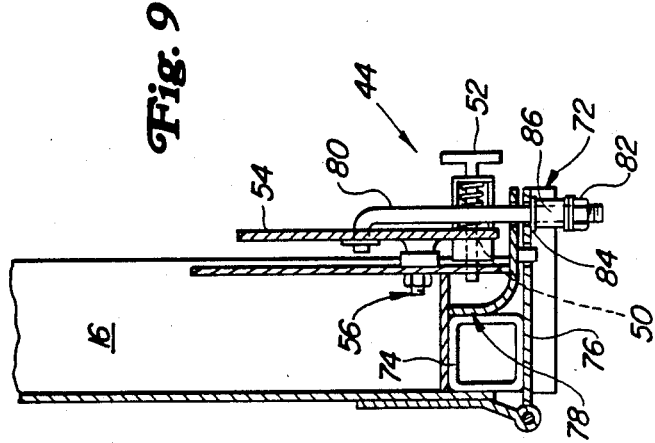

LOADER SUPPORT STAND

ASSIGNMENT

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

1. Field of the Invention

The present is relates to agricultural power loaders, and more particularly to a parking stand designed to support the mast portions of the loader when it is dismounted from the tractor.

2. Background of the Prior Art

Many and varied forms of support structures have been designed to elevate and/or support the mast portions of agricultural loaders when they are dismounted. These forms include stands carried by the masts, the lift arms, and/or other parts of the loader frame. Some are permanently carried by the loader while others are detachable or totally separate structures that receive the loader. Many are equipped with pins, clips or other parts that must be separately stored from the stand and may or may not require special or separate tools for their installation. Generally these stands extend beneath the loaders making their use with tractors having mid-mount mowers or similar tools difficult if not impossible.

SUMMARY OF THE PRESENT INVENTION

The present invention is designed to provide a loader support permanently attached to the loader mast, having all the parts required for use and storage, and which is quickly and easily converted between a stored and a use configuration. Further, it is compatible with tractors having mid-mount mowers.

The present invention provides a loader support structure which extends first laterally from the mast and then downwardly so as to provide clearance beneath the tractor to allow it and a mid-mounted mower to move into and out of a parked loader.

The present invention further provides a loader stand which is compact and unobstrusive when in the unused or stored position on the loader, yet includes all the parts necessary to utilize it in its operative position as a stand.

Further, the loader support stand is quickly and easily moved by the operator from its transport and stored position to its operative mast supporting position in which it securely and reliably supports the mast in an elevated position above the ground.

Further, there are required no special tools and/or separate parts required to utilize the stand in its working configuration.

These and other aspects of the present invention will become apparent to those skilled in the art as they read the following specification and discussion of the operation of the invention.

BRIEF DESCRIPTION OF THE DRAWINGS

In the drawings:

FIG. 5 is a front elevational view of the stand in its mast supporting position.

FIG. 6 is a top view of the stand's pivotal leg joint taken along line 6—6 of FIG. 5.

FIG. 7 is a partial illustration of the pivotal leg joint taken along lines 7—7 of FIG. 5 with an alternate position of one supporting leg illustrated in phantom lines.

FIG. 8 is a front elevational view of the stand in its stored position adjacent the mast.

FIG. 9 is a partial side elevational view taken along lines 9—9 of FIG. 8 and illustrating the stand when in the stored configuration.

DETAILED DESCRIPTION OF THE INVENTION

In the following description, only one loader mast and stand supporting structure need be discussed since each side of the loader and its mast and stand structure have identical, but mirror image components.

Figure 1:
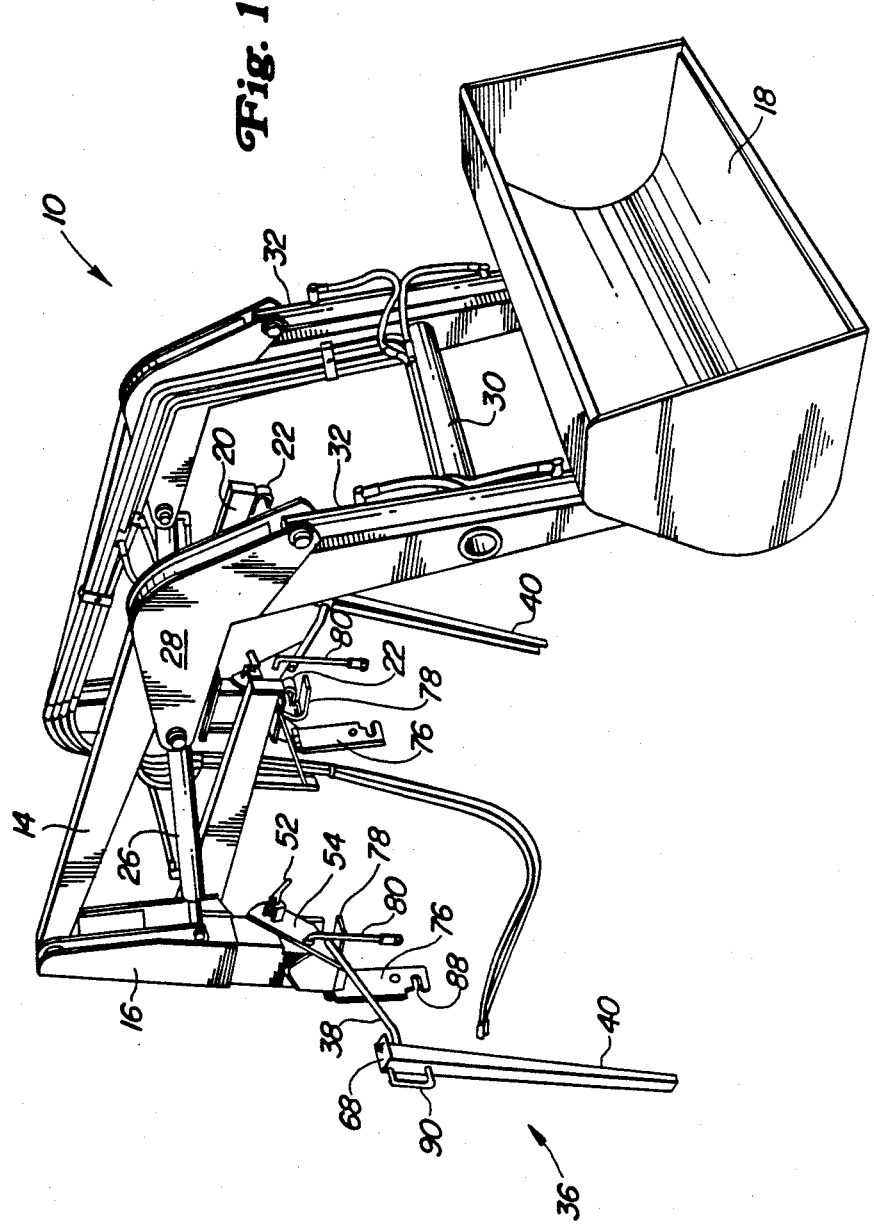
FIG. 1 is a side perspective of an agricultural loader in its dismounted position with the mast supported by a stand constructed in accordance with the present invention.
Figure 2:
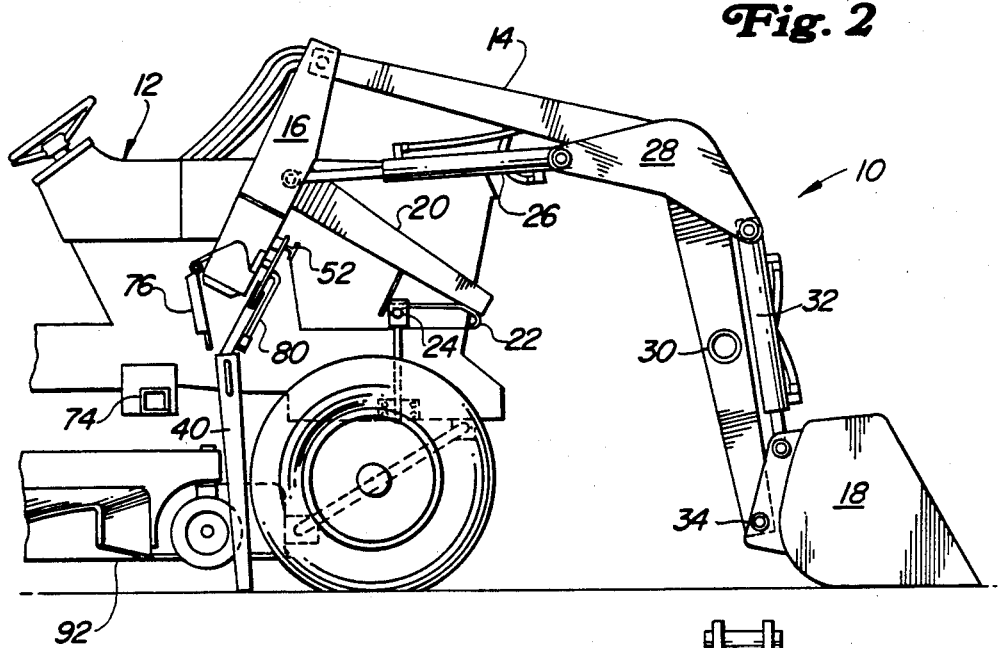
FIG. 2 is a side elevational view of the loader and stand being mounted onto a tractor.
Figure 3:
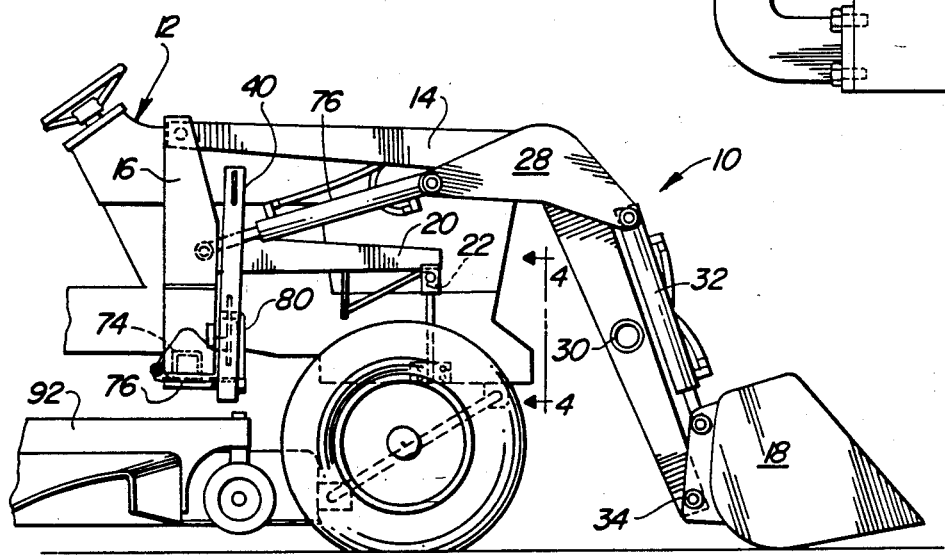
FIG. 3 is a side elevational view of the mounted loader having the stand in its stored configuration.

Looking now to FIG. 1, there is illustrated an agricultural loader 10 in a stored or dismounted position. As shown in FIGS. 2 and 3, the loader 10 is generally used in combination with a tractor 12, but can be utilized with other units such as track-laying vehicles.

Figure 4:
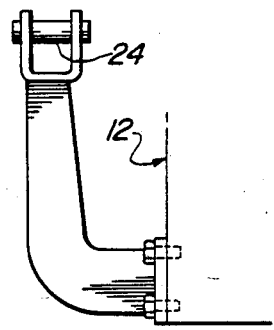
FIG. 4 is a front elevational view of a tractor front mounting structure adapted to support the side frame member of the loader.

The typical agricultural loader includes a pair of lift arms 14 which are pivotally supported at their rear ends by mast structures 16. Carried at the forward ends of the lift arms 14 is a working tool, such as the bucket designated by the number 18. Also coupled to and extending forwardly from the mast 16 for providing stability to the loader structure are side frame members 20. These members 20 carry at their forward ends a mounting bracket 22 connectable to a compatible mating structure 24 carried on the front and side portion of the tractor (see FIGS. 2, 3 and 4).

Pivotally connected to the center portion of each mast 16 is a hydraulic cylinder 26 which extends forwardly to a plate 28 carried at the mid-part of the lift arm 14. This cylinder 26 is used to raise and lower the lift arm 14 relative to the mast 16 and tractor 12. Connecting the two lift arms 14 at their forward and central portions is a cross tube stabilizing structure 30. Also carried at the forward portion of each lift arm 14 is a hydraulic cylinder 32 adapted to rotate the working tool or bucket 18 about its pivotal connection 34 with the ends of the lift arms 14.

In reviewing the stand and its construction, attention is now directed particularly to FIGS. 1, 5, 8 and 9.

The stand 36 includes a first leg designated 38 which is pivotally connected to a second leg designated 40. The pivotal connection 42 enables the two legs 38 and 40 to be quickly and easily folded together for storage during loader use as shown in FIGS. 3 and 8 or unfolded to support the mast 16 during its storage, as shown in FIGS. 1, 2 and 5. Securing the loader stand 36 in either of its two positions, that is its folded or unfolded position, is a latch means 44. The latch means is comprised of first and second openings 46 and 48 in the mast 16 and opening 50 in the first leg 38 through which can be removably inserted a spring loaded pin 52. The location of the pin 52 when the stand 36 is in position, that is, its unfolded position, and the loader 10 is being stored is illustrated in FIG. 5. The position of the pin 52 and stand 36 in its folded position when the loader 10 is being used is shown in FIG. 8.

The first leg 38 is formed, in the preferred embodiment, by tubular steel and welded at its one end to a flat steel portion or arm 54 which is in turn pivotally mounted between its ends to the mast at pivot structure 56 (see FIGS. 5, 9 and 8). It is through this flat steel portion 54 that the opening 50 is provided for the pin 52 to secure the first leg 38 in the two positions illustrated in FIGS. 5 and 8.

The second leg 40 is comprised, in the preferred embodiment of an elongated U-shaped member. It is connected to the first leg 38 by the pivot pin 58 which is carried in a block 60. The block 60 is adapted to oscillate about an axis 62 passing through the lower section of the first leg 38 and thereby permit the second leg 40 limited fore-and-aft movement relative to the first leg 38 during the loading and unloading procedure (see FIG. 2). This oscillation must, however, be restricted to prevent collapse of the legs 38 and 40 and accordingly a stop means 64 is provided. The stop means or structure 64 takes the form of a pin designated 66 and a cap carried at the top of the second leg 40. The pin 66 is provided in the lower section of the first leg 38, and restricts movement of the block 60 and second leg 40 about the longitudinal axis 62 of the lower end portion of the leg 38 as it engages the first and second abutment surfaces 70 provided in the cap 68. This limited oscillation is illustrated by the alternate position of the second leg 40 depicted in phantom in FIG. 7.

A further feature of the present invention takes the form a latching means 72 for securing the mast 16 to the tractor support means 74. The latching means 72 is provided at the base of the mast 16 and includes parts of the stand 36 and mast 16 for securing the mast 16 to the tractor support structure 74. As illustrated, the mast supports take the form of tubular frame members projecting laterally from the tractor. The latching means 72 includes a pivotal lock plate 76 best illustrated in FIGS. 1 and 9, which is supported on the mast 16 for swinging movement around the tractor support 74 so that it, along with the lower U-shaped support-receiving structure 78 of the mast 18 encase the tractor support 74.

To secure the pivotal lock plate 76 in place, there is provided on the stand 36 a lock bolt 80. The lock bolt 80 is swingably carried on the flat end portion 54 of the first leg 36. The lock bolt 80 carries at its lower portion an adjustable nut 82, washers 84 and spacer sleeve 86. The washer 84 is of sufficient size to abut against the lower sides of the lock plate 76 once the bolt 80 has been inserted into the slot 88.

To secure the lock plate 76 in the position encasing the tractor support 74, as illustrated in FIG. 9, the operator first manually raises the lock plate 76 from the hanging position of FIG. 5 to the raised position of FIG. 9. The lock bolt 80 is then swung into the slot 88 and the first leg 38 then moved to the storage position illustrated in FIG. 8. This swinging movement of the first leg 38 simultaneously raises the lock bolt 80 from its lowered position illustrated in FIG. 5 to the elevated position illustrated in FIG. 8 causing the washer 84 to abut the bottom of the lock plate 76 and secure it in a locked position Since the lock bolt 80 is swingably secured to the first leg 38 at a position offset from the pivotal support or fore-and-aft extending pivot structure 56 about which the first leg 38 is rotated, that offset serves as a lever arm and provides the operator with additional leverage to move the lock plate 76 into place and draw the mast 16 down onto the tractor support 74.

In operation, the improved parking stand 36 of the present invention is in the folded configuration as illustrated in FIG. 3. In this position, it is stored adjacent the mast 16 and provides little additional structure to obscure vision, inconvenience the operator or the operation of the loader during loader use. When the operator desires to dismount the loader and store the loader upon its stand, he needs no additional tools or parts to move the stand to its active configuration. After dismounting the tractor, the operator pulls the latch pin 52 from the openings provided in the end portion 54 of the first leg 38 and the mast 16, grasps the handle 90 provided on the second leg 40 and rotates the first leg 38 and second leg 40 about the pivotal connection 56 with the mast 16 from the stored position to that illustrated in FIGS. 1 and 5. The stop means 64 provided at the pivotal connection 42 between the first and second legs 38 and 40 automatically positions the second leg 40 relative to the first leg 38 for supporting the mast 16. The limited amount of oscillation provided in the pivotal connection 42 between the first and second legs 38 and 40 permits the leg 40 to engage the ground as illustrated in FIG. 2 so that it will support the mast 16 until the loader 10 is securely engaged with the front and rear tractor frame supports 22 and 74.

The laterally offset configuration of the parking stand 36 permits the operator to use mid-mounted mowers 92 and similar implements beneath the tractor 12 and still drive into and out of the parked loader 10. Further, the stand 36 permits the lift arm cylinder 26 to be fully retracted during loader storage and thereby prevent damage to the cylinder rods.

We claim:

1. In a power loader adapted to be removably mounted on a vehicle such as a tractor, said vehicle having loader support means carried on each side thereof, the improvement residing in a loader support stand carried by the mast of the loader and foldable between a first stored position adjacent the mast and a second operative position extending from and below the mast to support the mast above the ground when the loader is removed from the vehicle, the improved stand comprising:

a first leg pivotally coupled with the loader mast;

a second leg pivotally coupled to one end of the first leg;

latch means between the first leg and mast for securing the first leg in a first position adjacent to the mast or alternatively a second position extending laterally from the mast;

stop means carried adjacent to the pivotal connection between the first and second legs, effective to limit pivotal movement of the second leg relative to the first leg so that when the first leg is in its second position, the second leg projects generally vertically, and when the first leg is in its first position, the second leg may be moved to a folded position alongside the first leg.

2. The invention defined in claim 1 wherein the pivotal connection between the first and second leg further permits limited rotational movement of the second leg about the first leg.

3. The invention defined in claim 1 wherein the pivotal connection includes a block carried on the first leg with a pivot pin interconnecting the block and the second leg so as to permit pivotal movement therebetween and a stop pin carried in the first leg abutable with first and second surfaces of the second leg to permit limited rotational movement of the second leg about the first leg.

4. The invention defined in claim 1 wherein the latch means includes first and second openings carried in the mast and a spring loaded pin carried by the first leg alignable with said openings so as to selectively secure the first leg in either opening.

5. The invention defined in claim 1 wherein the loader support carried by the vehicle is a transversely projecting member and there is further provided means between the mast and stand to secure the mast to the transversely projecting member, said means comprising:
   a lock plate carried at the bottom of the mast and adapted to swingably move between a first position around the transversely projecting member and a second position not surrounding said member;
   a lock bolt pivotally carried by the first leg offset from the pivotal connection between the first leg and mast;
   said bolt being engageable with the lock plate when the first leg is in its second position and effective to swingably move and secure the lock plate into its first position.

6. Mast support means for an agricultural loader having at least one mast adapted to, rest upon a laterally extending support carried by a vehicle, said means comprising:
   fore-and-aft extending pivot structure carried by the mast;
   an arm swingably mounted at an intermediate portion by the pivot structure;
   leg structure pivotally connected to one end of the arm;
   stop means between the leg structure and one end of the arm wherein swinging pivotal movement is permitted between the structure and arm and between the arm and the mast between a first folded position adjacent the mast and a second unfolded position where the arm extends outwardly from the mast and the leg structure extends downwardly from the arm and whereby the stop means limits the pivoting of the leg structure in the unfolded position so that the leg structure extends downwardly from the arm;
   latch means between the mast and arm for securing the arm in either its folded or unfolded position.

* * * * *